(12) United States Patent
Hebert

(10) Patent No.: US 8,777,166 B2
(45) Date of Patent: Jul. 15, 2014

(54) MODULAR OPTICAL BOX

(75) Inventor: Thomas K. Hebert, Salisbury, MA (US)

(73) Assignee: FLIR Systems, Inc., Wilsonville, OR (US)

( * ) Notice: Subject to any disclaimer, the term of this patent is extended or adjusted under 35 U.S.C. 154(b) by 639 days.

(21) Appl. No.: 13/024,044

(22) Filed: Feb. 9, 2011

(65) Prior Publication Data

US 2012/0200212 A1 Aug. 9, 2012

(51) Int. Cl.
*G12B 9/00* (2006.01)

(52) U.S. Cl.
USPC ........................................................ 248/27.1

(58) Field of Classification Search
USPC ................... 248/27.1, 276.1, 288.31
See application file for complete search history.

(56) References Cited

U.S. PATENT DOCUMENTS

| | | | | |
|---|---|---|---|---|
| 3,895,268 A | * | 7/1975 | May et al. | 361/837 |
| 4,030,807 A | * | 6/1977 | Briney | 359/220.1 |
| 4,039,246 A | * | 8/1977 | Voigt | 359/220.1 |
| 4,085,910 A | * | 4/1978 | Baker et al. | 244/3.16 |
| 4,520,973 A | * | 6/1985 | Clark et al. | 244/3.16 |
| 5,530,547 A | * | 6/1996 | Arnold | 356/458 |
| 6,026,109 A | * | 2/2000 | Micke et al. | 372/92 |
| 6,036,140 A | * | 3/2000 | Tranapp et al. | 244/3.16 |
| 6,129,307 A | * | 10/2000 | Deoms et al. | 244/3.16 |
| 6,705,774 B2 | * | 3/2004 | Tashiro et al. | 396/427 |
| 6,765,733 B1 | * | 7/2004 | Igl et al. | 359/822 |
| 6,785,067 B1 | * | 8/2004 | Andrews | 359/819 |
| 7,264,220 B2 | * | 9/2007 | Dent et al. | 248/660 |
| 7,330,649 B2 | * | 2/2008 | Finizio et al. | 396/146 |
| 7,408,653 B1 | * | 8/2008 | LaCarrubba | 356/614 |
| 7,614,804 B2 | * | 11/2009 | Kim | 396/427 |
| 7,811,010 B2 | * | 10/2010 | Yamashita | 396/427 |

* cited by examiner

*Primary Examiner* — Darnell Jayne
*Assistant Examiner* — Andrew Roersma
(74) *Attorney, Agent, or Firm* — Haynes and Boone, LLP

(57) ABSTRACT

A modular, self-contained optical box is provided. The optical box has a back plate fixedly attached to a front wall. Optical sensors, such as infrared cameras, visible cameras and optical pointers, are fixedly attached to the front wall and the back plate. Distal, round ends of the optical sensors are captured by translation plates. Each translation plate is capable of moving the distal end of the optical element in two directions to or in a planar fashion to align the optical element to the optical box, or to adjust the line of sight of the optical sensors relative to the optical box, before securing the distal end of the optical element. The optical box is designed to be incorporated into a gimbal, and the front wall forms a part of an outer housing of the gimbal. In one embodiment, the optical box is rotatable about one axis relative to the gimbal.

19 Claims, 2 Drawing Sheets

MODULAR OPTICAL BOX

FIELD OF THE INVENTION

This invention generally relates to a modular optical box that fixedly secures and aligns a plurality of active and passive optical sensors, such as cameras and lasers, etc. therein. The modular optical box is incorporated into a larger system, such as a gimbal, which may contain other optical elements, non-optical elements, electronic and computer equipments.

BACKGROUND OF THE INVENTION

Gimbals are pivoted supports that can rotate in one or more axis. In one application, optical elements, such as infrared cameras, digital or analog cameras in the visible electromagnetic range, and laser pointers, among other things are mounted to be rotated in at least two axes inside gimbals. These gimbals are mounted on surveillance aircrafts, such as drones, helicopters and fixed wing airplanes, naval vessels, military/law enforcement vehicles, etc. Commercial gimbals, such as the Ultra 8000 family of surveillance gimbals or the Cobalt 350 gimbal among many others, are manufactured by FLIR Systems, Inc. based in Billerica, Mass., Goleta, Calif. and Wilsonville, Oreg.

Optical equipments are typically individually installed in gimbals. Each has to be aligned individually within gimbals, which are typically about 3 inches to 16 inches in diameters and preferably about 9 inches or less in diameter, and has to be connected to electronic and computer equipments designed to allow images taken by the optical equipments to be transported, processed or stored.

Optical equipment can also be mounted on optical benches or base plates, which are then installed inside gimbals. Examples of optical benches are discloses in U.S. Pat. Nos. 5,841,592, 6,788,476, 5,058,993, 7,631,839 and 4,798,462 and US publication number US2009/0175308. A potential drawback of conventional optical benches is that the benches may distort when inserted into another structure, such as gimbals.

Hence, there remains a need for an optical box that is preferably modular and can be installed into gimbals after the optical elements are installed and aligned in the box.

SUMMARY OF THE INVENTION

Hence, the invention is directed to an optical box comprising a back plate fixedly attached to a front wall, wherein at least one optical element is fixedly attached at a first end to the front wall and a second end of the at least one optical element passes through an aperture in the back plate and is captured by a translation plate. The translation plate is capable of moving the second end of the at least one optical element in two directions to align the at least one optical element to the optical box and wherein the translation plate secures the second end of the at least one optical element after it is aligned The optical box is self-contained or modular and is incorporated into a gimbal. Preferably, the front wall forms a part of an outer housing of the gimbal, and in one embodiment the optical box is rotatable about one axis relative to the gimbal. Using a part of the outer housing allows the optical box to maximize the use of space within the gimbal.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

The present invention is directed to an optical box that preferably includes a back support plate connected to a portion of the housing of the gimbal. The housing portion is preferably spherical or hemispherical. Optical elements, which include but are not limited to, infrared cameras, digital and analog cameras in the visible electromagnetic range, laser pointers, are mounted to the back plate and to the gimbal housing. The optical box provides alignment means to adjust the optical sensors prior to fixedly securing them to the optical box. Once fixedly secured, it its preferred that the optical box is installed to the gimbal without further alignment. The electronics that connect the optical sensors to displays, memories or storage devices, computer or processing equipments, can be attached to the back plate so that the electronics can also be connected to the optical sensors.

Preferably, the inventive optical box is modular, i.e., it is a self-contained unit that can be installed and function on a gimbal. Preferably, the entire optical box is rotatable about one of the gimbal's axes of rotation.

Figure 1:
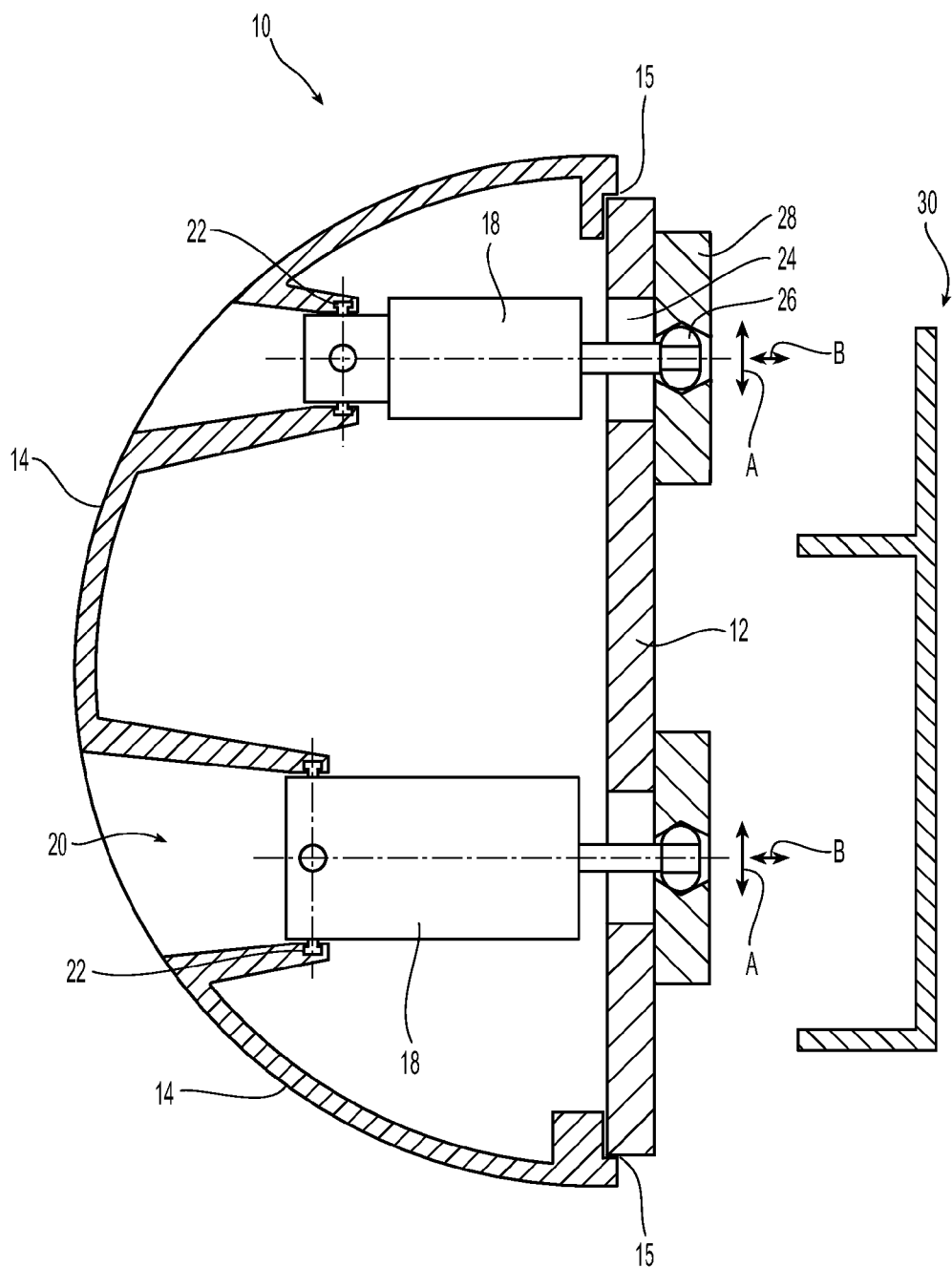
FIG. 1 is a schematic, cross-sectional view of the inventive optical box.
Figure 3:
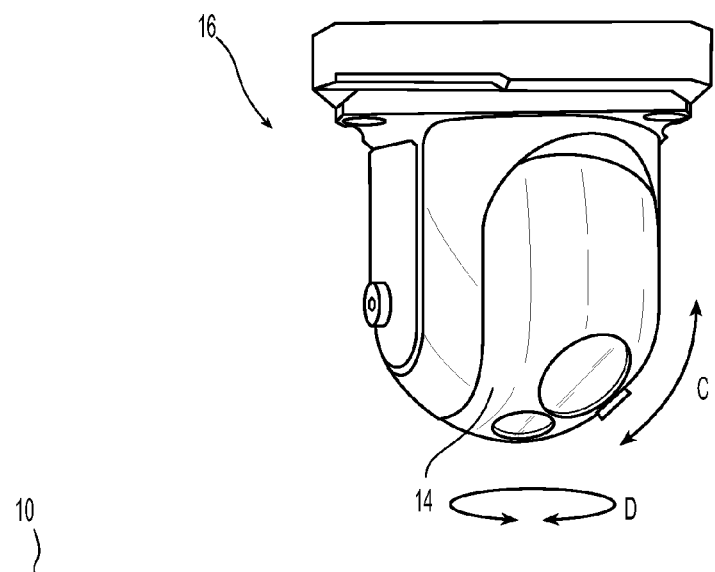
FIG. 3 is a perspective view of a gimbal with the inventive optical box installed therein.
Figure 2:
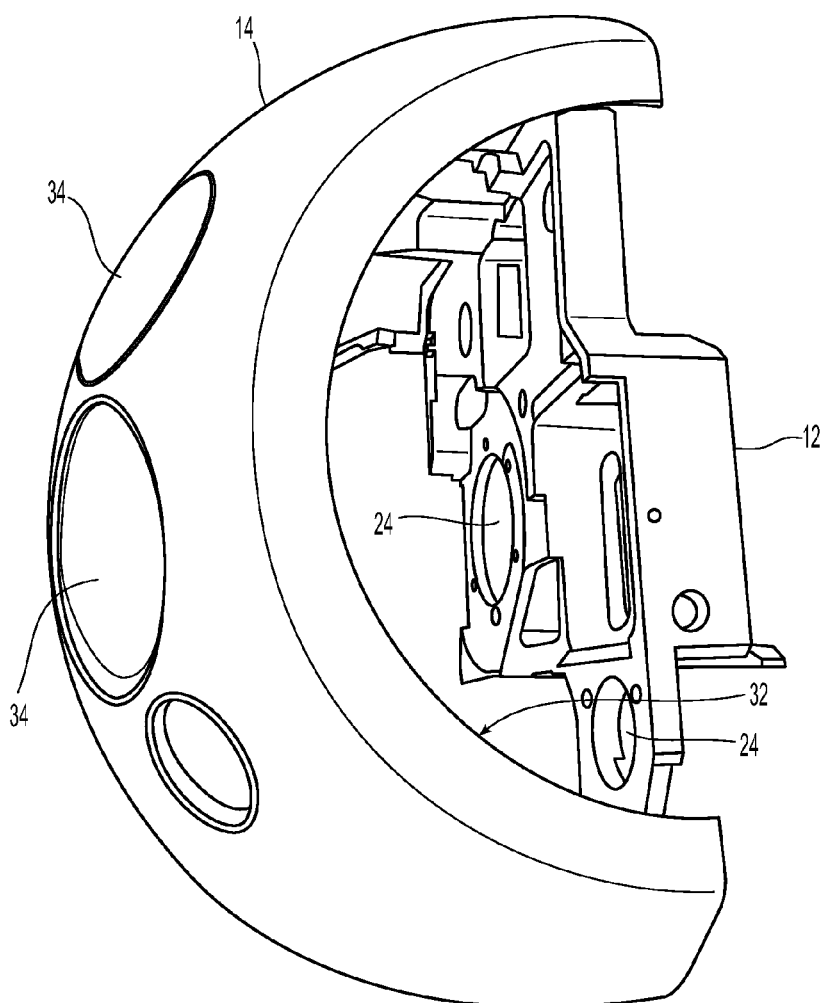
FIG. 2 is a perspective view of an embodiment of the inventive optical box illustrated in FIG. 1.

Referring to FIGS. 1-3, optical box 10 comprises back plate 12 and front curvilinear wall 14, which forms a portion of gimbal 16. Although shown as curvilinear and preferably spherical, front wall 14 can have any shape. Back plate 12 can be fixedly or permanently attached to front wall by any known methods, including but not limited to threaded fasteners, rivets, or any fasteners that allow the parts to be disassembled for repairs or optical sensor replacement. Attached to both back plate 12 and front wall 14 are a plurality of optical sensors 18. Although two optical sensors 18 are shown in FIG. 1, there can be any number of optical sensors mounted within optical box 10. Front wall 14 defines a number of sockets 20, one for each optical element 18. The front end of each optical element 18 is fixedly retained in socket 20. Preferably, O-ring mount or ball-and-socket joint 22 is provided to seal optical element 18 to socket 20. Front end of optical element 18 can also be attached to socket 20 by garter springs or spherical ball joint or other joints so long as optical element 18 is rotatable in about two axes. Also, socket 20 is flared outward, as shown in FIG. 1, so that socket 20 would not attenuate or limit the field-of-view of optical sensors 18.

As shown and discussed herein, optical box 10 comprises two members, i.e., back plate 12 and front wall 14. Optical box 10 may have any number of members attached to each other, and the present invention is not limited to any particular number of members. Although front wall 14 preferably has a hemispherical shape to provide front wall 14 with increased hoop stress for enhanced structural rigidity, front wall 14 can have any shape. Back plate 12 can also have any shape, including curved or partially spherical.

The back end of optical element 18 passes through aperture 24 on back plate 12 and round, distal end 26 of optical element 18 is captured by translation plate 28. Apertures 24 preferably have circular shape, as illustrated in FIG. 2, but can have any shape. Translation plate 28 is movable in a circular direction around aperture 24, i.e., in a circular direction about a longitudinal axis of optical sensor 18, as shown by arrow A in FIG. 1. Although the movement is circular, arrow A is illustrated as a linear arrow since FIG. 1 is a cross-sectional view and the circular motion is substantially orthogonal to the cross-section. Alternatively, translation plate 28 is movable within a plane, e.g., a plane substantially parallel to back plate 12. This planar movement can be linear or curvilinear to affect a rotational alignment of optical sensor 18. In other words, translation plate 28 is movable in a radial direction in order to align optical element 18 at a proper angle. An example of translation plate 28 is described in U.S. Pat. No. 3,588,232, which is incorporated herein by reference in its entirety. As shown in the '232 patent, translation plate 28 can also adjust optical element 18 in a direction along the longitudinal length of optical element 18, as shown by arrow B in FIG. 1. The '232 patent also uses a ball joint in combination with a linear movement to affect an angular adjustment. After optical sensors 18 are properly aligned, the positions of translation plates 28 are securely affixed or set to lock in the positions and orientations of optical sensors 18. Other designs of translation plate 28 can be used and the present invention is not limited to any particular design.

The alignments discusses above can arrange optical sensors 18 to be parallel to each other, which is known as bore sighting. Alternatively, optical sensors 18 can be aligned in a non-paralleled fashion.

To restrain optical sensors 18 between back plate 12 and hemispherical front wall 14, optical sensors 18 should be restrained in six directions or by six degrees of freedom, i.e., three translational directions XYZ in the Cartesian coordinate and three rotational directions about the same XYZ coordinates. The connection between optical elements 18 and front wall 14 restrain two translational movements of optical elements 18, i.e., the two translational directions orthogonal to the longitudinal axis of optical elements 18. The connection between optical elements 18 and back plate 12 restrain the remaining translational movement of optical elements 18 along the longitudinal axis and the three rotational movements. Other restraining alternatives can be used with the present invention.

As shown in FIG. 1, optical box 10 is self-contained with optical sensors 18 affixed and restrained therein. Optionally, electronic support 30 can be attached to the back side of back plate 12 to electronically connect optical sensors 18 to displays, memories, processing units or computers to process the signals or images received by optical sensors 18.

FIG. 2 illustrates one embodiment of optical box 10. Back plate 12 can have any shape and defines any number of openings and apertures 24 to receive optical sensors 18 (omitted for clarity). Gimbal 16 has an axle, which is inserted through corresponding holes on back plate 12 to allow self-contained optical box 10 to rotate about curved rim 32 while in operation along arrow C, as best shown in FIG. 3. The entire gimbal 16 is also rotatable along arrow D, thereby providing gimbal 16 with two degrees of freedom. Optional windows 34 may be provided on socket 20 to keep debris out of socket 20 and optical sensors 18 and improves aerodynamic efficiency by reducing air drag.

Optical box 10 maximizes the space available for optical sensors 18, because it utilizes a portion of the outer housing to fix the sensors, as discusses above. The structure of optical box 10 is rigid, and possesses high structural integrity and high resistance to distortion, when fastened or inserted into another assemble, such as gimbals. Additionally, optical sensors 18 are precisely located and aligned relative to their exit apertures or sockets 20. Advantageously, the alignments use common parts and tools and all are accessible from the same direction and same part, i.e., back plate 12.

Optical box 10 may have other shapes and configurations, as discussed above. Furthermore, optical box 10 can be used in a pan tilt pointing system, non-gimbaled or fixed optical structures.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

I claim:

1. A device, comprising:
   an optical box including a back plate fixedly attached to a front wall, wherein first and second optical elements are each fixedly attached at a first end directly to the front wall with a pivotal joint, wherein the first end of each optical element is opposite to a second end of the optical element, and wherein the second ends of the first and second optical elements pass through respective first and second apertures in the back plate and are captured by respective first and second translation plates,
   wherein the first and second translation plates are configured to:
      move the second ends of the respective first and second optical elements in two directions parallel to the back plate to align the first and second optical elements to the optical box; and
      secure the second ends of the respective first and second optical elements after the first and second optical elements are aligned, and
   wherein the optical box is incorporated into a gimbal and the front wall forms a part of an outer housing of the gimbal.

2. The optical box of claim 1, wherein the second end of the first optical element is shaped and dimensioned to be captured by the first translation plate, and wherein the second ends of the first and second optical elements are secured to the back plate by the first and second translation plates.

3. The optical box of claim 1, wherein the first translation plate is configured to move the second end of the first optical element in a circular motion about a longitudinal axis of the first optical element.

4. The optical box of claim 1, wherein the first translation plate is configured to move the second end of the first optical element in a translational motion along a longitudinal axis of the first optical element.

5. The optical box of claim 1, wherein a ball-and-socket joint is provided at the attachment between the front wall and the first end of the first optical element.

6. The optical box of claim 1, wherein the first end of the first optical element is attached to a socket on the front wall.

7. The optical box of claim 6, wherein a window is provided for the socket.

8. The optical box of claim 1, wherein electrical supports to the first and second optical elements are provided on the back plate.

9. The optical box of claim 1, wherein the front wall is hemispherical or spherical and fixedly attached directly to the back plate.

10. The optical box of claim 1, wherein the first optical element comprises an infrared camera, a visible camera or a pointer.

11. The optical box of claim 1, wherein the optical box is rotatable about one axis relative to the gimbal.

12. The optical box of claim 1, wherein the first translation plate is configured to move the second end of the first optical element within a plane.

13. A method of forming a device having an optical box with a back plate, the method comprising:
   fixedly attaching the back plate directly to a front wall of the optical box;
   fixedly attaching, at a first end, first and second optical elements directly to the front wall with a pivotal joint, wherein the first end of each optical element is opposite to a second end of the optical element, and wherein the second ends of the first and second optical elements pass through respective first and second apertures in the back plate and are captured by respective first and second translation plates;
   moving, with the first and second translation plates, the second ends of the respective first and second optical elements in two directions to align the first and second optical elements to the optical box;
   securing, with the first and second translation plates, the second ends of the respective first and second optical elements after the first and second optical elements are aligned; and
   incorporating the optical box into a gimbal, wherein and the front wall forms a part of an outer housing of the gimbal.

14. The method of claim 13, wherein the moving comprises moving the second end of the first optical element in a circular motion about a longitudinal axis of the first optical element and wherein the securing comprises securing the second ends of the first and second optical elements to the back plate with the first and second translation plates.

15. The method of claim 13, wherein the moving comprises moving the second end of the first optical element in a translational motion along a longitudinal axis of the first optical element.

16. The method of claim 13, wherein the fixedly attaching, at the first end, the first and second optical elements directly to the front wall comprises fixedly attaching, at the first end, the first optical element directly to the front wall using a ball-and-socket joint at the attachment between the front wall and the first end of the first optical element.

17. The method of claim 13, wherein the fixedly attaching, at the first end, the first and second optical elements directly to the front wall comprises fixedly attaching, at the first end, the first optical element directly to a socket on the front wall.

18. The method of claim 13, further comprising:
   providing electrical supports to the first and second optical elements on the back plate.

19. The method of claim 13, wherein the moving comprises moving the second end of the first optical element within a plane.

* * * * *